United States Patent
Miller et al.

(10) Patent No.: US 12,524,222 B2
(45) Date of Patent: Jan. 13, 2026

(54) BUILDING AN OPERATING SYSTEM WITH AN AUTOMATION SYSTEM

(71) Applicant: Red Hat, Inc., Raleigh, NC (US)

(72) Inventors: Adam Miller, Fort Worth, TX (US); Pierre-Yves Chibon, Saint-Pol-de-Léon (FR)

(73) Assignee: Red Hat, Inc., Raleigh, NC (US)

( * ) Notice: Subject to any disclaimer, the term of this patent is extended or adjusted under 35 U.S.C. 154(b) by 274 days.

(21) Appl. No.: 18/338,031

(22) Filed: Jun. 20, 2023

(65) Prior Publication Data

US 2024/0427585 A1 Dec. 26, 2024

(51) Int. Cl.
*G06F 8/65* (2018.01)
*G06F 8/61* (2018.01)

(52) U.S. Cl.
CPC . *G06F 8/65* (2013.01); *G06F 8/63* (2013.01)

(58) Field of Classification Search
USPC .......................................................... 717/168
See application file for complete search history.

(56) References Cited

U.S. PATENT DOCUMENTS

| | | | | |
|---|---|---|---|---|
| 2008/0046708 A1* | 2/2008 | Fitzgerald | ................. | G06F 8/64 |
| | | | | 713/2 |
| 2008/0163171 A1* | 7/2008 | Chess | ................... | G06F 9/5077 |
| | | | | 717/120 |
| 2009/0077366 A1* | 3/2009 | Brown | ..................... | G06F 8/63 |
| | | | | 713/2 |
| 2016/0359692 A1* | 12/2016 | Iszlai | .................... | H04L 41/122 |
| 2017/0322792 A1* | 11/2017 | Rozee | .................. | G06F 9/4406 |
| 2023/0008839 A1 | 1/2023 | Henry et al. | | |

FOREIGN PATENT DOCUMENTS

| | | |
|---|---|---|
| CN | 110750333 | 2/2020 |
| EP | 4033726 | 7/2022 |

OTHER PUBLICATIONS

Timothy Dilbert; "Automated Windows Image Building with Red Hat Ansible"; BMT blogsite (blog.bmt.ky) [full URL included in ref.]; Jan. 13, 2023 (Year: 2023).*
Weston Bassler; "DC/OS Agent AMI using Packer and Ansible"; Medium.com blogsite [full URL included in ref.]; May 21, 2018 (Year : 2018).*
Luiz Eduardo Serrano; "Understanding and Creating Ansible Execution Environments"; Cloudnroll.com website [full URL included in ref.]; May 22, 2023 (Year: 2023).*

(Continued)

*Primary Examiner* — Yuqing Xiao
*Assistant Examiner* — Clint Thatcher
(74) *Attorney, Agent, or Firm* — Dority & Manning, P.A.

(57) ABSTRACT

A method includes building, by a processing device implementing a automation system, by executing a project file executable by the automation system, a pre-configured operating system image, wherein the automation system supports a plurality of nodes in a distributed system, and wherein the pre-configured operating system image conforms to a pre-defined configuration; deploying, by executing the project file, the pre-configured operating system image; and deploying, using the pre-configured operating system image, a system at a node of the plurality of nodes.

20 Claims, 6 Drawing Sheets

(56) References Cited

OTHER PUBLICATIONS

Chiradeep BasuMallick; "What Is Ansible?"; Spiceworks.com website [full URL included in ref.]; Jul. 12, 2022 (Year: 2022).*

Jin, Edward, "Building a Customized Azure VM Image with Image Builder and Libvirt", May 18, 2020, Red Hat, Inc., https://www.redhat.com/en/blog/building-customized-azure-vm-image-image-builder-and-libvirt, 14 pages.

Estupinan, Andres, "Convert Ansible Playbooks for AMI Creation into EC2 Image Builder Component Documents", Dec. 13, 2022, Amazon Web Services, Inc., https://aws.amazon.com/blogs/modernizing-with-aws/ansible-playbooks-ec2-image-builder-components/, 7 pages.

Bagmar, Vimal et al., "Migrating from HashiCorp Packer to EC2 Image Builder", Sep. 3, 2022, Amazon Web Services, Inc, https://aws.amazon.com/blogs/mt/migrating-from-hashicorp-packer-to-ec2-image-builder/, 11 pages.

Munns, Chris, "Executing Ansible Playbooks in your Amazon EC2 Image Builder Pipeline", Jul. 8, 2022, Amazon Web Services, Inc, https://aws.amazon.com/blogs/compute/executing-ansible-playbooks-in-your-amazon-ec2-image-builder-pipeline/, 12 pages.

* cited by examiner

BUILDING AN OPERATING SYSTEM WITH AN AUTOMATION SYSTEM

TECHNICAL FIELD

The present disclosure is generally related to configuration management in computer systems, and more particularly, to building an operating system with an automation system.

BACKGROUND

Configuration management is a system engineering process for establishing and maintaining consistency of a product's performance, function, and physical attributes with the product's requirements, design, and operational information throughout the lifetime of the product. Automation system tools, such as automation system software, provide information technology (IT) engines that support provisioning, configuration management, orchestration, and application deployment in a distributed system.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
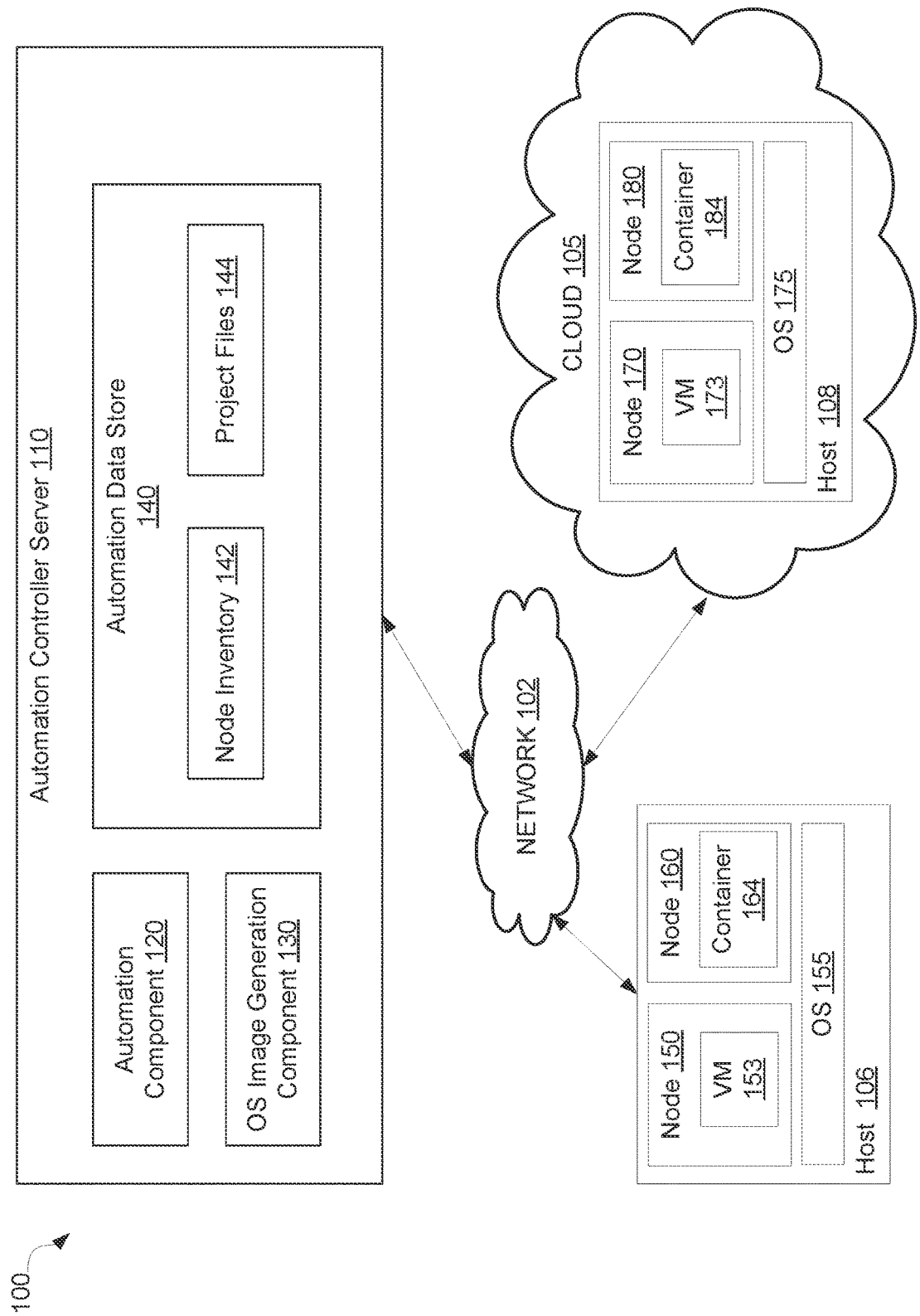
FIG. 1 depicts a high-level component diagram of an example of a computer system architecture, in accordance with one or more aspects of the present disclosure.

Described herein are methods and systems for enabling an automation system to provide a customized, pre-configured operating system by maintaining and executing a project file of the automation system. An automation system, such as Ansible, offers a repeatable, re-usable configuration management and multi-machine deployment system for deploying complex applications. The automation system can declare configurations, orchestrate steps of any manual ordered process on multiple sets of machines in a defined order, and launch tasks synchronously or asynchronously. The automation system can be used to store a desired state of the systems and help to maintain that state. The automation system can make changes and deployments of systems faster, remove the potential for human error, while making system management predictable and scalable. The automation system also keeps track of the state of the resources, and keep the system from repeating tasks, like installing the same package twice.

The automation system can support multiple nodes in a distributed system. A node may refer to a computing device (e.g., physical machine), a virtual machine, or a combination thereof. A project file (also known as "playbook") refers to a script that automates the provisioning, configuration, orchestration, and/or deployment of applications to nodes of the automation system. The automation system allows executing a task more than once by creating a project file and placing it under source control. The project file can be used to push out new configuration or confirm the configuration of remote systems. In some implementations, the automation system works by connecting to the nodes and pushing out small programs—called modules—to these nodes. Modules are used to accomplish automation tasks in the automation system. These modules are written to be resource models of the desired state of the system. The automation system then executes these modules against these nodes. The automation system can be integrated into existing infrastructures and workflows and can operate on an already-booted system over some network protocols. The automation system can automate a provision of a basic operating system and then allow the operating system to be configured and customized on an already-booted system.

Internet of Things (IoT) devices and edge computing devices are demanding ways to build custom images because these devices are either associated with customized hardware or customized operating system. An image refers to data representing executables and files of the application used to deploy functionality for a runtime instance of the application. Some tools, such as OSbuild, can be used to build an operating system image with certain level of configuration, but still cannot provide a custom image with sufficient customization of configuration and cannot be integrated into existing widely-adopted systems. As such, every time a node requires a customized operating system, a series of processes for configuring the system are needed. The configuring processes can significantly increase the workload when multiple nodes require a same customized operation system because each node would need to be configured with the same processes repeatedly.

Aspects of the present disclosure address the above and other deficiencies by enabling an automation system to provide an operating system image that includes user-specific configurations at a pre-boot time. When the operation system is booted for the first time via the operation system image, the operating system provides the user-specific configurations without the need of update and cleanup operations for such configurations during or after the boot. In some implementations, the automation system provides such operating system image by using a tool (e.g., plug-in) or maintaining a file in the automation system. For example, the automation system can maintain a project file, where the project file provides all information needed to run a system including configurations specific to a user. As such, the project file can be an abstract representation of what the operation system would run as, and every time a node by executing the project file provides an operating system including the user-specific configurations. Specifically, executing the project file enables the automation system to build and deploy a customized, pre-configured operating system image, leading to a system ready for running without additional configuration at the running system (or with minimal configuration at the running system). As such, the configurating management system provides a customized and pre-configured system to a user device (e.g., IoT devices or edge computing devices) by executing the project file. The project file can be customized according to the needs of the user device. In maintaining the project file, the automation system can modify the project file responsive to detecting a change in a predefined configuration, for example, instructed by a user.

Specifically, the project file includes a series of tasks that automatically execute against a node, where a group of nodes form a node inventory. Each task can be executed by a module of the automation system. Each module of the automation system contains metadata that determines when and where a task is executed, as well as which user executes it. Executing the project file enables the automation system to perform a series of tasks against a node at a specific time.

In some implementations, by executing the project file, the automation system can build an operating system image based on a user's specification. The user's specification provides information to be included in the operating system, such as, for example, specific user credentials, authentication, applications, middleware, library, etc. In one example, the automation system can create a filesystem, partition the filesystem according to specification, mount partitions, install application packages on partitions, create user accounts, install first root filesystems (i.e., a first filesystem that is mounted when the system begins to boot) to form a filesystem template and create an image (e.g., a disk image) that contains data of the filesystem template. The filesystem refers to a method and data structure that an operating system uses to control how data is stored and retrieved. Partitioning the filesystem can provide multiple filesystems with different attributes, for example, where the attributes can be defined in specifications, and each specification provides all information necessary for implementing the filesystem and can be user-specific. Mounting partitions can activate the partition filesystem to make its content accessible so that applications can be installed, accounts can be created, and/or the first root filesystem can be installed.

In some implementations, upon building the operating system image, the automation system can, by executing the project file, deploy the operating system image remotely. Deploying the operating system image remotely means transforming the operating system image from a packaged form to an operational working state so that the operating system image can work in a remote location. For example, the automation system can upload the operating system image (e.g., the disk image created) to a cloud computing environment, A cloud computing environment may provide a cloud in which one or more nodes can be hosted on physical machines. The automation system can then create one or more instances of the system using the operating system image. Creating an instance of the system provides a copy of the operating system image to, for example, a node supported by the automation system so that the computing resources and configurations provided with the operating system image are available to use on the node. The capability of using the same project file to provide multiple instances of the customized, pre-configured operating system image can significantly decrease the repeating workload for each instance in configurating the customized operating system as well as errors during the configuration process.

In some implementations, the project file can also include information of configuring network or other components for the operating system (e.g., setting up the network, virtual private network (VPN), secrets, etc.). The configuration step can be arranged in the project file to be performed during building the operating system image or after deploying the operating system image. As such, by executing the project file, the automation system can provide a system ready for running on a node, for example, by an IoT device or edge computing device.

Advantages of the present disclosure include improving efficiency and speed of providing operating systems to IoT devices and edge computing devices. Instead of using the existing automation system to automate the use of the operating system image building tool, the aspects of the present disclosure provide a simple way to build and deploy the customized, pre-configured operating system image with minimum during/after boot configuration. In addition, since the change made to a running system can have a great number of side effects, instead of enacting a change on a running system, the aspects of the present disclosure can make a change in a project file so that the change can be applied to many systems without those potential side effects of a running system. Further, using the automation system integrated with operating system image building and deployment functionality provides an easy-to-use application programmer interface (API) for applications to request the building, deploying and configuring of operating system images.

FIG. 1 is a block diagram of a network architecture 100 in which implementations of the disclosure may operate. In some implementations, the network architecture 100 may be used to implement an automation system to in accordance with implementations of the disclosure. The automation system supports provisioning, configuration management, orchestration, and application deployment in a distributed system implemented using network architecture 100. In one implementation, the network architecture 100 includes an automation controller server 110 communicably coupled via a network 102 to one or more nodes 150, 160, 170, 180. Network 102 may be a private network (e.g., a local area network (LAN), a wide area network (WAN), intranet, or other similar private networks) or a public network (e.g., the Internet).

A node 150-180 can provide computing functionality to execute applications and/or processes associated with the applications. For example, nodes 150-180 may include, but are not limited to, application servers, database servers, content servers, load balancers, monitoring systems, alert systems, and so on. In one implementation, each node 150-180 may be hosted on any type of computing device, such as a server computer system, a desktop computer or any other computing device. In one implementation, one or more of the nodes 150-180 may be hosted in a cloud-computing environment 105 (also referred to herein as a cloud). For example, cloud 105 may include nodes 170, 180. In some implementations, a node 150-180 is implemented as a virtual machine (e.g., VM 153, 173) that is hosted on a physical machine (e.g., host machine) implemented as part of the cloud 105. In some implementations, a node 150-180 is implemented as a container (e.g., container 164, 184) that is hosted on a physical machine implemented as part of the cloud 105. A container is a standard unit of software that packages up software code and all its dependencies so that an application runs quickly and reliably from one computing environment to another. A container image may be executed in the container, where the container image is a lightweight, standalone, executable package of software that includes all items used to run an application, such as software code, runtime, system tools, system libraries and settings. When nodes 170-180 are implemented as VMs or containers, for example, the nodes 150-180 may be executed by operating systems (e.g., OS 155, 175) on host computing machines (e.g., host 106, 108). Each host 106, 108 may be a server computer system, a desktop computer, or any other computing device.

In some implementations, the nodes 150-180 are located in a data center. Users can interact with applications executing on the cloud-based nodes 170, 180 using client computer systems (not pictured), via corresponding client software (not pictured). Client software may include an application such as a web browser. In other implementations, the applications may be hosted directly on hosts 106, 108 without the use of VMs (e.g., a "bare metal" implementation), and in such an implementation, the hosts themselves are referred to as nodes.

In various implementations, developers, owners, and/or system administrators of the applications may maintain applications executing in cloud 105 by providing software development services, system administration services, or other related types of configuration services for associated nodes in cloud 105. This can be accomplished by accessing cloud 105 using an application programmer interface (API) within the applicable cloud service provider system. In some implementations, a developer, owner, or system administrator may access the cloud service provider system from a client device that includes dedicated software to interact with various cloud components. Additionally, or alternatively, the cloud service provider system may be accessed using a web-based or cloud-based application that executes on a separate computing device that communicates with client device via a network. The client device may be a mobile device, a PDA, a laptop, a desktop computer, a tablet computing device, a server device, or any other computing device. The cloud service provider system may include one or more machines such as server computers, desktop computers, etc.

In one implementation, the automation system implemented in network architecture 100 includes an automation controller server 110. For example, the automation controller server 110 can manage the provisioning, configuration, orchestration, and/or application deployment of one or more nodes of an automation system. As such, the automation controller server 110 may handle the provisioning, configuration, orchestration, and application deployment with respect to nodes, such as nodes 150-180, of the automation system. Although illustrated in FIG. 1 as a single machine, the automation controller server 110 may reside on one or more machines (e.g., server computers, desktop computers, etc.)

In one implementation, the automation controller server 110 include an automation component 120, an operating system (OS) image generation component 130, and an automation data store 140. Although the automation component 120, the OS image generation component 130, and the automation data store 140 are illustrated as residing on a single machine, these components may be distributed across multiple separate machines implementing the functionality of the automation controller server 110. The automation component 120 manages nodes 150-180 and includes functionality to provision, configure, orchestrate, and/or deploy applications to the nodes 150-180 in the automation system.

In one implementation, the automation component 120 maintains an inventory 142 of the nodes 150-180 in the automation data store 140. In one implementation, the automation data store 140 may be a memory (e.g., random access memory), a cache, a drive (e.g., a hard drive), a flash drive, a database system, or another type of component or device capable of storing data. The automation data store 140 may also include multiple storage components (e.g., multiple drives or multiple databases) that may also span multiple computing devices (e.g., multiple server computers).

In one implementation, automation component 120 accesses one or more project files 144 to utilize in provisioning, configuring, and/or deploying applications to nodes 150-180. The project files 144 may include software code or script that automates the provisioning and/or configuration of nodes 150-180 by the automation component 120. In one implementation, a project file 144 may define the work to be done for a configuration of a node 150-180 managed by the automation controller server 110. In one implementation, the project files 144 may be written in YAML (YAML Ain't Markup Language) (.yml) file format. The project file 144 may be written by an administrator with environment-specific parameters for the node 150-180. The project file 144 may be written and provided by a user of the automation system. The format of the project file 144 may describe the characteristics and format details of a project file of the automation system. In one implementation, the automation system may generate the project files 144 of the automation system.

In one implementation, execution of the project file 144 may cause an automated provision and/or configuration process to be performed with respect to a node 150-180. For example, the execution of the project file 144 may include, but are not limited to, deploying a project file on a node 150-180, installing a software package on a node 150-180, initializing a cloud-based infrastructure on a node 150-180, and many other tasks for configuration management, network device management, infrastructure maintenance, and so on. In one implementation, the project file 144 is an organized set of scripts that can be executed against one or more nodes 150-180. The organized set of scripts can include multiple subsets of scripts in an order, where each subset of scripts describes a task that can be executed against the node, such that multiple tasks are executed in the order. In some implementations, the project file 144 may include a module (i.e., existing program) that can be executed against one or more of the nodes 150-180 to cause one or more processes to be performed with respect to the nodes 150-180.

The OS image generation component 130 may build, deploy, and configure a system ready for running by execution of the project file 144. In one implementation, execution of the project file 144 can build an OS image based on the user's specifications, deploy the OS image remotely (e.g., by uploading an image to a cloud computing service and starting an instance), and configure network or other components to the OS image (e.g., setting up the network, VPN, secrets, etc.). The user's specifications can include various configuration setup, including credentials, authentication, applications, middleware, library, or other related information included in the OS. Building the OS image means constructing the system by creating operation system artifacts, where operating system artifacts can include system requirement, system design information, source code files, and executables, and in some implementations, building the OS image may also include configuring the system. For example, the OS image generation component 130 may configure network or other components for the OS image so that the OS image can perform various functions.

For example, the OS image generation component 130 may generate an image for an operating system by assembling custom images of operating systems according to the precise needs of the user. The resulting image may be stored in an image repository (e.g., data storage system) for subsequent use.

In one example, the OS image generation component 130 takes a pipeline description as input and produces filesystem trees, images, or other artifacts as output. The pipeline description gives comprehensive control over the individual steps to execute as part of a pipeline, and can include required parameters to each pipeline stage. The pipeline description may be in a format of JSON (e.g., ./samples/base-rpm-qcow2.json). The OS image generation component 130 may need to run with supervisor privileges to create the OS image.

Deploying the OS image means transforming the system from a packaged form to an operational working state. For example, the OS image generation component 130 may deploy the OS image by uploading the image directly to a cloud computing service and start an instance. In some implementations, the OS image generation component 130 may create multiple instances using the OS image such that each instance would provide the same configurations included in the OS image to run in a respective node.

In some implementations, the OS image generation component 130 may use predefined components of the automation system to fulfill the task of building, deploying, and configuring the system indicated in the project file. For example, the project file can serve as automation blueprints, in YAML format, that the automation system uses to deploy and configure nodes in an inventory. The predefined components of the automation system may include collections, roles, modules, and plugins. Collections are a distribution format for content of the automation system. Roles are data structures that includes groups of content so that the groups can be reused and shared among projects. Roles allow automatically loading related variables, files, tasks, handlers, and other artifacts based on a known file structure (e.g., a predefined directory structure). Modules (also referred to as "task plugins" or "library plugins") are discrete units of code that can be used from the command line or in a project file task. The automation system executes each module, usually on the remote managed node, and collects return values. Plugins are pieces of code that augment the automation system's core functionality, and enable the automation system with rich, flexible and expandable implementations.

Figure 2:
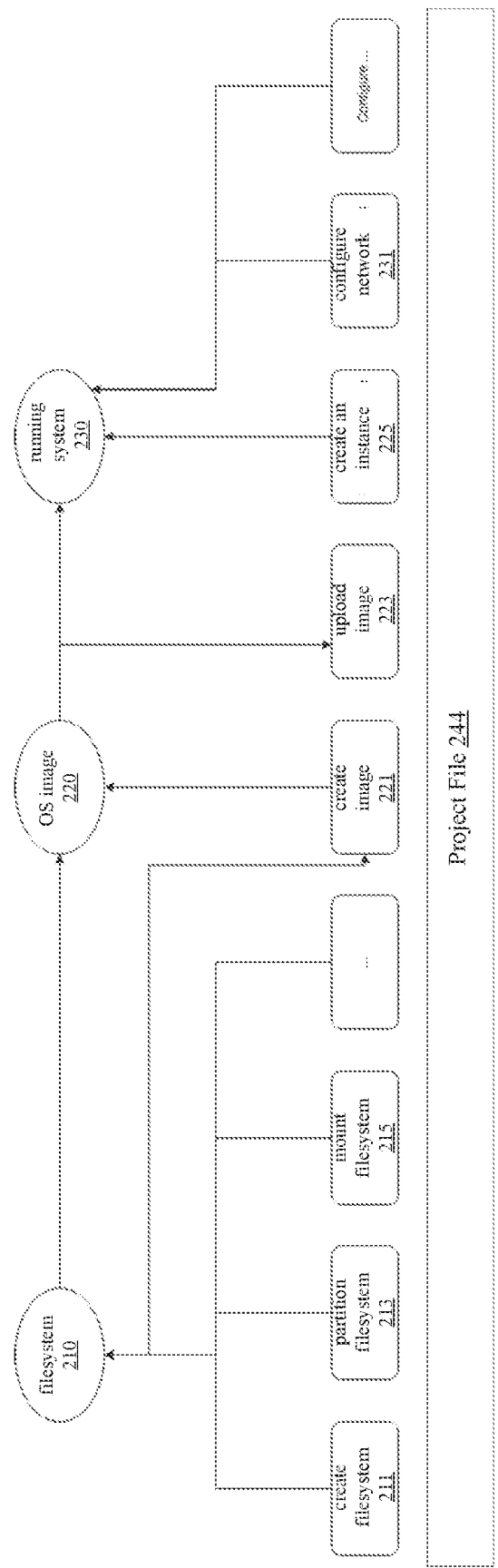
FIGS. 2 and 3 depict examples of project files used to build an operating system, in accordance with one or more aspects of the present disclosure.

FIG. 2 illustrates one example of building, deploying, and configuring a system ready for running by executing an example project file 244. The project file 244 provides organized units of scripts that can be executed to create a filesystem 211, partition it according to specifications 213, mount partitions 215, install packages on partitions, create accounts, install first root filesystems (e.g., initramfs), etc. to form a filesystem 210 and create an image that contains data of the filesystem 221. The project file 244 provides organized units of scripts that can be executed to take the created image as an OS image 220, upload the OS image to a cloud computing service 223, and create an instance of the system using the OS image 225. The project file 244 provides organized units of scripts that can be executed to configure the network 231 and other components/processes to build a system ready for running 230.

Figure 3:
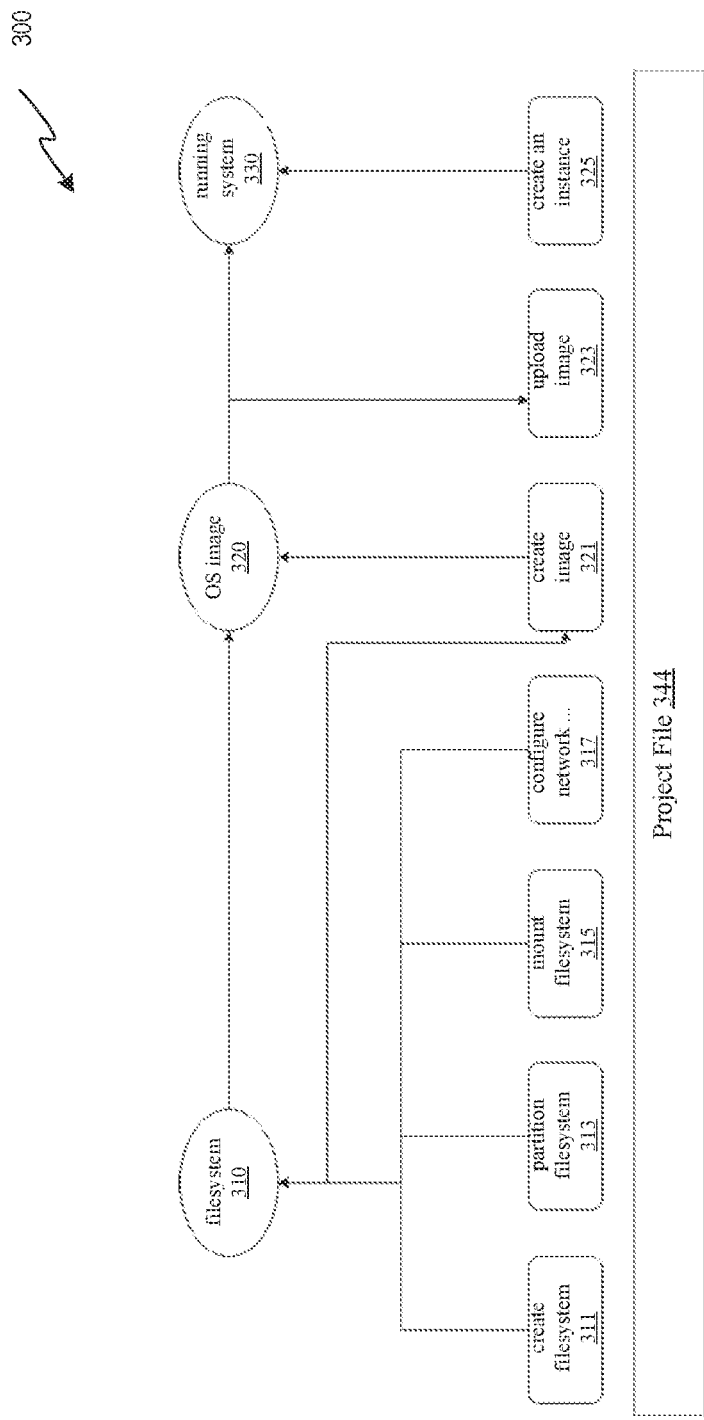

FIG. 3 illustrates another example of building, deploying, and configuring a system ready for running by executing an example project file 344. The project file 344 provides organized units of scripts that can be executed to create a filesystem 311, partition it according to specifications 313, mount partitions 315, install packages on partitions, create accounts, install first root filesystems (e.g., initramfs), and configure the network 317 and other components/processes to form a filesystem 310 and create an image that contains data of the filesystem 321. The project file 344 provides organized units of scripts that can be executed to take the created image as an OS image 320, upload the OS image to a cloud computing service 323, and create an instance of the system using the OS image 325. The project file 244 provides organized units of scripts that can be executed to build a system ready for running 230.

As illustrated in FIGS. 2 and 3, building, deploying, and configuring a system ready for running can be implemented differently, for example, with different orders of tasks of building, deploying, and configuring.

Figure 4:
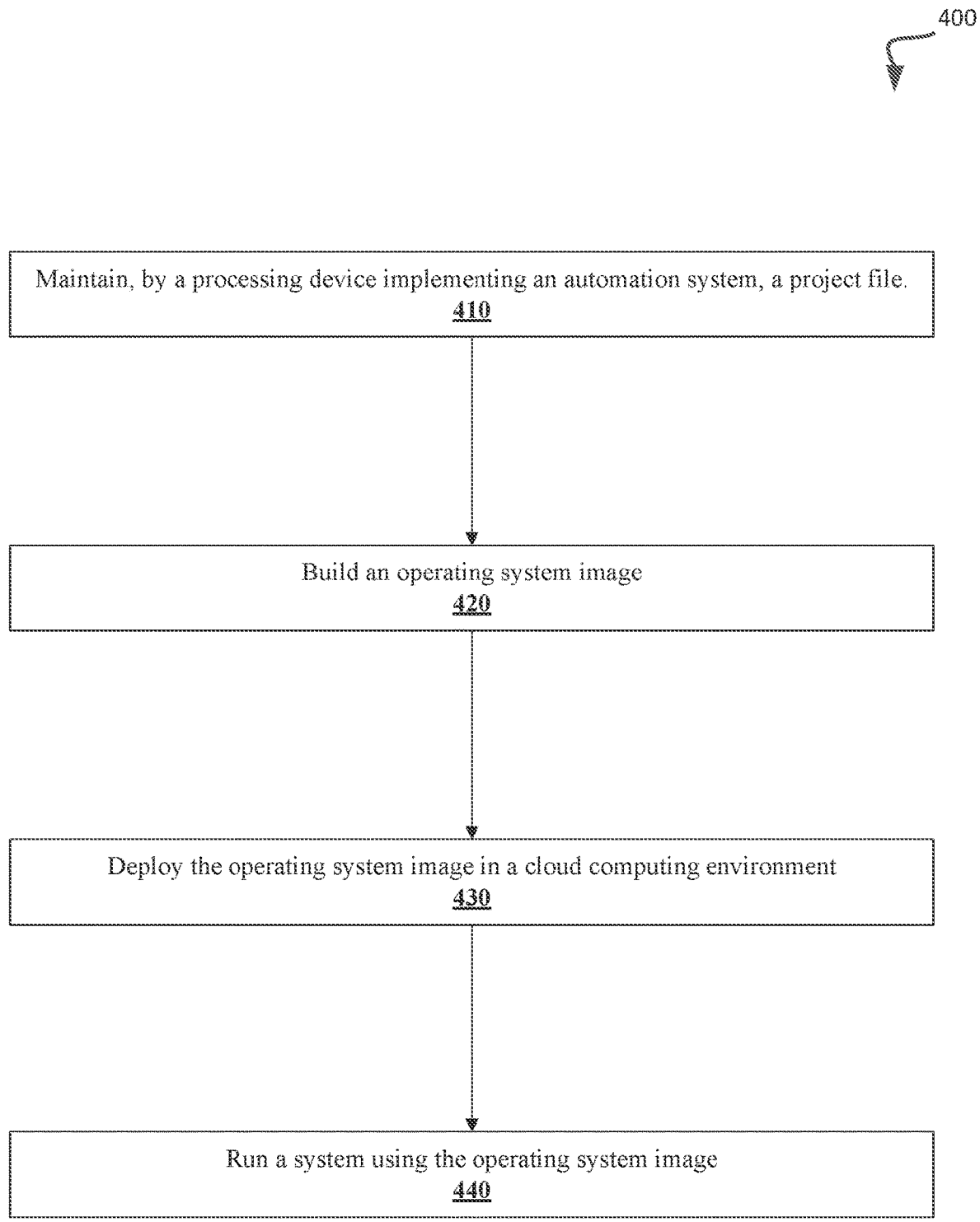
FIG. 4 depicts a flow diagram of an example method for building an operating system with an automation system, in accordance with one or more aspects of the present disclosure.

FIG. 4 depicts a flow diagram of an illustrative example of a method 400 for implementing an automation system to build a customized operating system by executing a project file of the automation system, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 400 may be performed by processing devices of a server device. The processing device implements an automation system, where the automation system supports a plurality of nodes in a distributed system. At operation 410, the processing device maintains a project file. By executing the project file, the processing device can perform the operations 420 and 430 to build and deploy a customized, pre-configured operating system image. In some implementations, the processing device may execute the project file by using one or more predefined components from the automation system.

At operation 420, the processing device builds a customized, pre-configured operating system image. In some implementations, the processing device can build an OS image based on the user's specifications (e.g., credentials, authentications, applications, middleware, libraries included in an OS). For example, the processing device may generate an image for an operating system by assembling custom images of operating systems according to the precise needs of the user. The resulting image may be stored in an image repository (e.g., data storage system) for subsequent use. In some implementations, the processing device may create a filesystem, partition it according to specifications, mount partitions, install packages on partitions, create accounts, install first root filesystems to form a filesystem and create an image that contains data of the filesystem. In some implementations, the processing device may additionally configure network or other components for the OS image to form a filesystem and create an image that contains data of the filesystem, for example, by setting a value of a network configuration parameter.

In some implementations, the processing device can create a filesystem, partition, according to a predefined specification, the filesystem into a plurality of partitions, and mount a first partition of the plurality of partitions. In some implementations, the processing device can install a software package on the first partition, create a user account on the first partition, or install a first root filesystem on the first partition. In some implementations, the processing device can create a disk image (e.g., ISO, AMI, or qcow2). In some implementations, the processing device can maintain the project file. In maintaining the project file, the processing device can modify the project file responsive to detecting a change in a predefined configuration.

At operation 430, the processing device deploys the customized, pre-configured operating system image in a cloud computing environment. For example, the processing device may deploy the customized, pre-configured OS image by uploading the image directly to a cloud computing service and start an instance or multiple instances. In some implementations, the processing device may upload the customized, pre-configured OS image to a cloud computing service 223, and create an instance of the system using the OS image that is ready for running.

At operation 440, the processing device runs, using the customized, pre-configured operating system image, a system at a node supported by the automation system. In some implementations, the processing device can boot the system using the customized, pre-configured operating system image without additional configuration of the system. In some implementations, the processing device may copy the pre-configured operating system image to a local memory of the node. In some implementations, the processing device may further configure the system to complete the configuration, for example, including a configuration for a network setup or a data security setup. The network configuration may include the process of assigning network settings, policies, flows, and controls. The data security configuration may include the process of setting up VPN, setting up parameters for sensitive data (e.g., Kubernetes Secrets).

Figure 5:
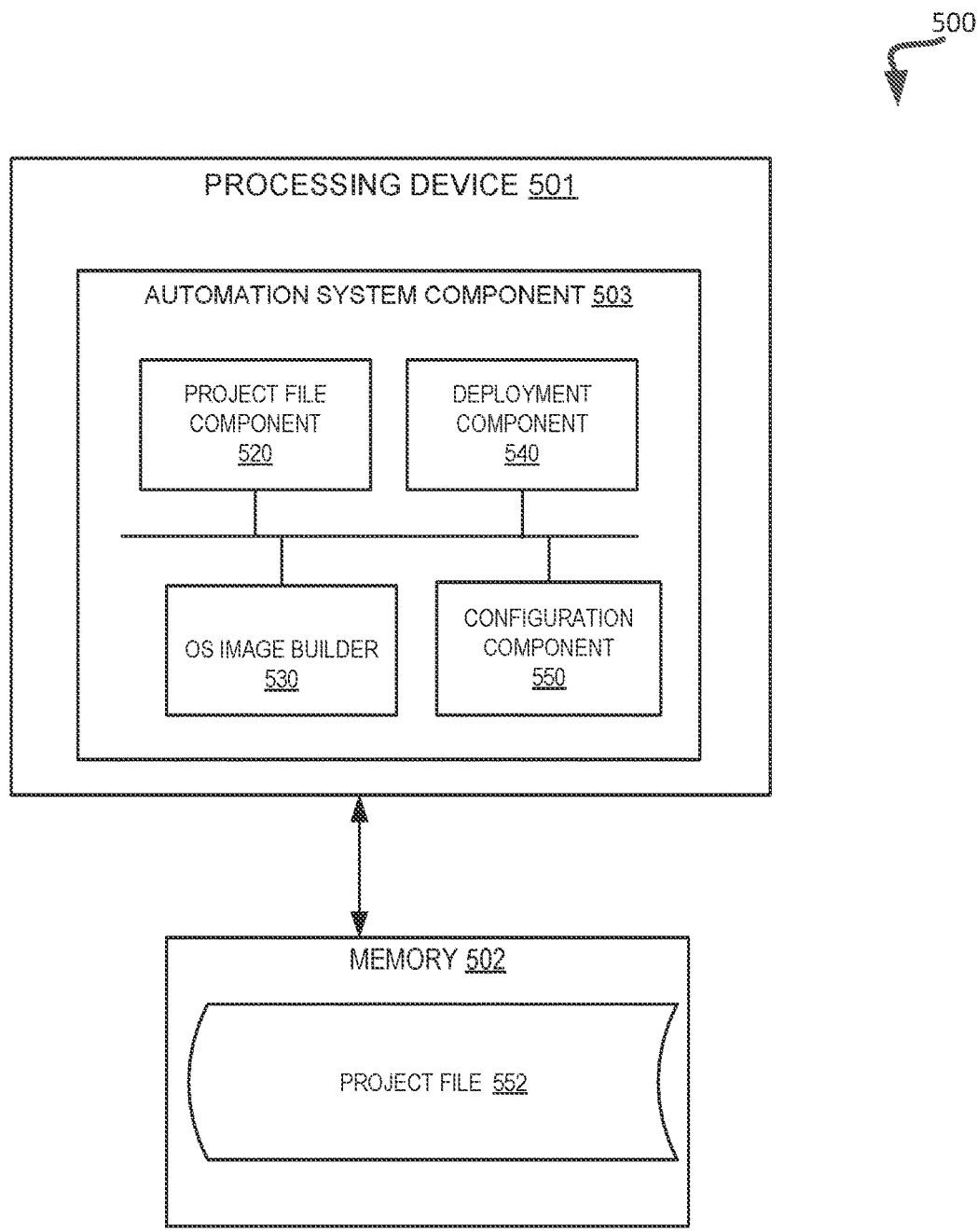
FIG. 5 depicts a block diagram of an example computer system in accordance with one or more aspects of the disclosure.

FIG. 5 depicts a block diagram of an automation system platform 500 operating in accordance with one or more aspects of the disclosure. Automation system platform 500 may be the same or similar to network architecture 100 and may include one or more processing devices 501 and one or more memory devices 502. In the example shown, the processing device 501 of automation system platform 500 may include an automation system component 503.

Automation system component 503 may include a project file component 520 that enables the processing device 501 to maintain a project file 552 that is executable by the automation system 500. The project file 552 may be stored in memory 502. The automation system component 503 may cause the project file 552 to be executed by the automation system platform 500 by further including an OS image builder 530, a deployment component 540, and a configuration component 550. The OS image builder 530 can build a customized, pre-configured OS image. The deployment component 540 can deploy the customized, pre-configured OS image that has been built from the OS image builder 530. The configuration component 550 can configure network or other components for the OS image, and can be part of the OS image builder 530.

Figure 6:
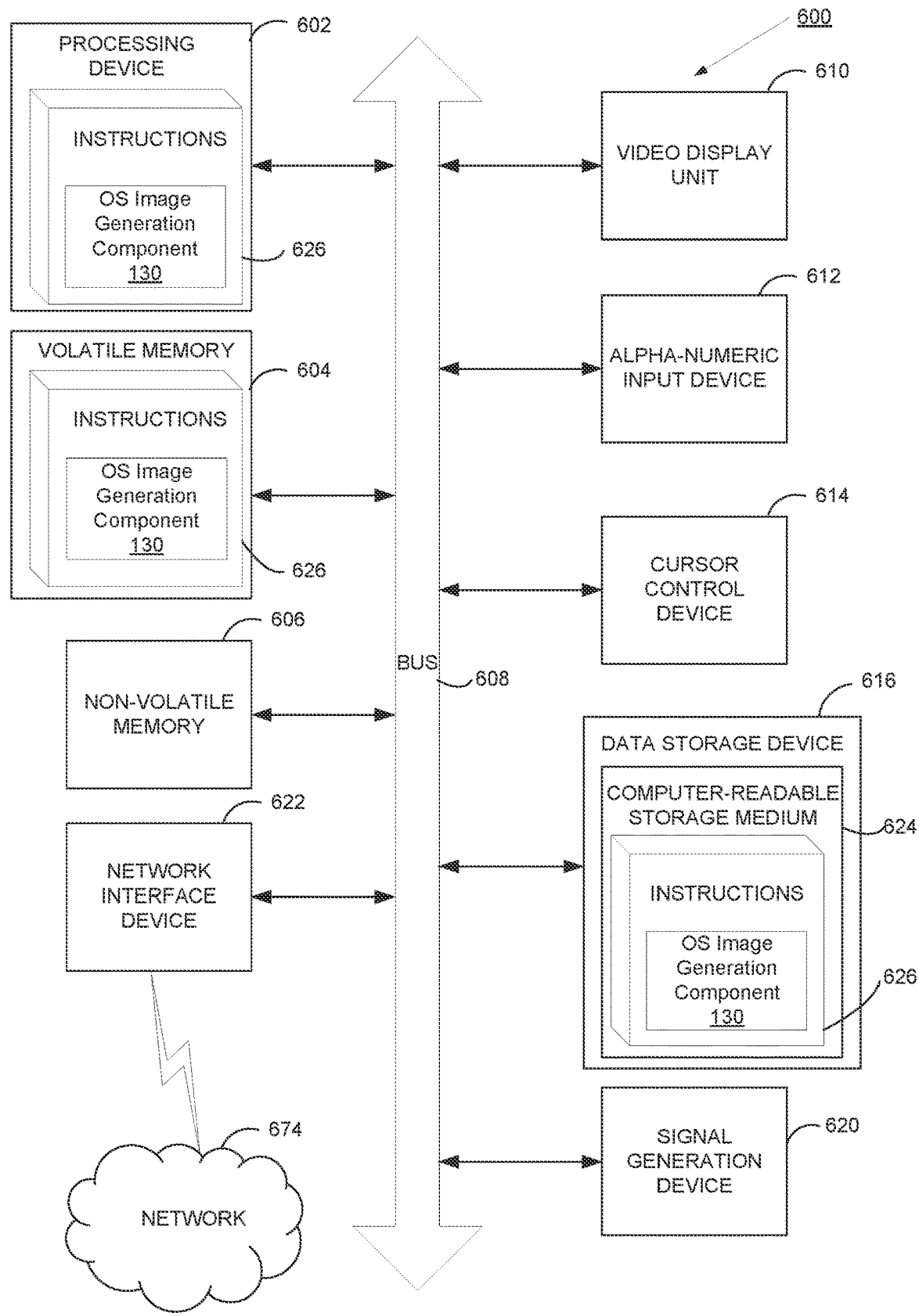
FIG. 6 depicts a block diagram of an example computer system operating in accordance with one or more aspects of the present disclosure.

FIG. 6 depicts an example computer system 600, which can perform any one or more of the methods described herein. In one example, computer system 600 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application-specific integrated circuit (ASIC), a field-programmable gate array (FPGA), a digital signal processor (DSP), network processor, or the like. The processing device 602 is configured to execute processing logic (e.g., instructions 626) that includes the OS image generation component 130 for performing the operations and steps discussed herein (e.g., corresponding to the method of FIG. 4, etc.).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a non-transitory computer-readable medium 624 on which may store instructions 626 that include OS image generation component 130 (e.g., corresponding to the method of FIG. 4) embodying any one or more of the methodologies or functions described herein. OS image generation component 130 may also reside, completely or at least partially, within the main memory 604 and/or within the processing device 602 during execution thereof by the computer system 600, the main memory 604, and the processing device 602 also constituting computer-readable media. API rule component 150 may further be transmitted or received via the network interface device 622.

While the computer-readable storage medium 624 is shown in the illustrative examples to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. Other computer system designs and configurations may also be suitable to implement the systems and methods described herein.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner.

It is to be understood that the above description is intended to be illustrative and not restrictive. Many other implementations will be apparent to those of skill in the art upon reading and understanding the above description. Therefore, the scope of the disclosure should be determined with reference to the appended claims, along with the full scope of equivalents to which such claims are entitled.

In the above description, numerous details are set forth. However, it will be apparent to one skilled in the art that aspects of the present disclosure may be practiced without these specific details. In some instances, well-known structures and devices are shown in block diagram form rather than in detail in order to avoid obscuring the present disclosure.

Unless specifically stated otherwise, as apparent from the following discussion, it is appreciated that throughout the description, discussions utilizing terms such as "receiving," "determining," "providing," "selecting," "provisioning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for specific purposes, or it may include a general-purpose computer selectively activated or reconfigured by a computer program stored in the computer. Such a computer program may be stored in a computer-readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general-purpose systems may be used with programs in accordance with the teachings herein, or it may prove convenient to construct a more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." That is, unless specified otherwise or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, the use of the term "an embodiment" or "one embodiment" or "an implementation" or "one implementation" throughout is not intended to mean the same embodiment or implementation unless described as such. Furthermore, the terms "first," "second," "third," "fourth," etc., as used herein, are meant as labels to distinguish among different elements and may not have an ordinal meaning according to their numerical designation.

What is claimed is:

1. A method comprising:
   accessing, by a processing device implementing an automation system, an automation data store comprising a project file defining an organized set of scripts that, when executed by the automation system, cause configuration of a node of a plurality of nodes in a distributed system supported by the automation system;
   building, by the processing device, by executing the project file, a pre-configured operating system image, wherein the pre-configured operating system image conforms to a predefined configuration;

deploying, by executing the project file, the pre-configured operating system image at a computing device other than the node of the plurality of nodes; and deploying, using the pre-configured operating system image, a system at the node of the plurality of nodes.

2. The method of claim 1, wherein building the pre-configured operating system image further comprises:

creating a filesystem;

partitioning, according to a predefined specification, the filesystem into a plurality of partitions; and mounting a first partition of the plurality of partitions.

3. The method of claim 2, wherein building the pre-configured operating system image further comprises at least one of:

installing a software package on the first partition, creating a user account on the first partition, or installing a first root filesystem on the first partition.

4. The method of claim 1, wherein building the pre-configured operating system image further comprises creating a disk image.

5. The method of claim 1, wherein building the pre-configured operating system image further comprises: setting a value of a network configuration parameter.

6. The method of claim 1, wherein deploying the pre-configured operating system image comprises:

uploading the pre-configured operating system image to a cloud computing environment comprising the node; and creating an instance of the pre-configured operating system image on the node.

7. The method of claim 1, wherein deploying the system further comprises:

copying the pre-configured operating system image to a local memory of the node.

8. The method of claim 1, wherein deploying the system further comprises:

configuring the system for at least one of: a network setup, or a data security setup.

9. The method of claim 1, further comprising:

responsive to detecting a change in the predefined configuration, modifying the project file.

10. An automation system comprising:

a memory;

a processing device coupled to the memory, the processing device to perform operations comprising:

accessing an automation data store comprising a project file defining an organized set of scripts that, when executed by the automation system, cause configuration of a node of a plurality of nodes in a distributed system supported by the automation system;

building, by executing the project file by the automation system, a pre-configured operating system image, and wherein the pre-configured operating system image conforms to a predefined configuration;

deploying, by executing the project file, the pre-configured operating system image at a computing device other than the node of the plurality of nodes; and deploying, using the pre-configured operating system image, a system at the node of the plurality of nodes.

11. The system of claim 10, wherein building the pre-configured operating system image further comprises:

creating a filesystem;

partitioning, according to a predefined specification, the filesystem into a plurality of partitions; and mounting a first partition of the plurality of partitions.

12. The system of claim 11, wherein building the pre-configured operating system image further comprises at least one of:

installing a software package on the first partition, creating a user account on the first partition, or installing a first root filesystem on the first partition.

13. The system of claim 10, wherein building the pre-configured operating system image further comprises creating a disk image.

14. The system of claim 10, wherein building the pre-configured operating system image further comprises: setting a value of a network configuration parameter.

15. The system of claim 10, wherein deploying the pre-configured operating system image comprises:

uploading the pre-configured operating system image to a cloud computing environment comprising the node; and creating an instance of the pre-configured operating system image on the node.

16. The system of claim 10, wherein deploying the system further comprises:

copying the pre-configured operating system image to a local memory of the node.

17. The system of claim 10, wherein deploying the system further comprises:

configuring the system for at least one of: a network setup, or a data security setup.

18. The system of claim 10, further comprising:

responsive to detecting a change in the predefined configuration, modifying the project file.

19. A non-transitory computer-readable storage medium comprising instructions that, when executed by a processing device, cause the processing device to perform operations comprising:

accessing an automation data store comprising a project file defining an organized set of scripts that, when executed by an automation system, cause configuration of a node of a plurality of nodes in a distributed system supported by the automation system;

building, by executing the project file by the automation system, a pre-configured operating system image and wherein the pre-configured operating system image conforms to a predefined configuration;

deploying, by executing the project file, the pre-configured operating system image at a computing device other than the node of the plurality of nodes; and deploying, using the pre-configured operating system image, a system at the node of the plurality of nodes.

20. The non-transitory computer-readable storage medium of claim 19, wherein the operations further comprise: responsive to detecting a change in the predefined configuration, modifying the project file.

* * * * *